Aug. 7, 1928.
F. LANG
1,679,831
COMBUSTION POWER ENGINE WITH SELF IGNITION
Filed Oct. 12, 1925
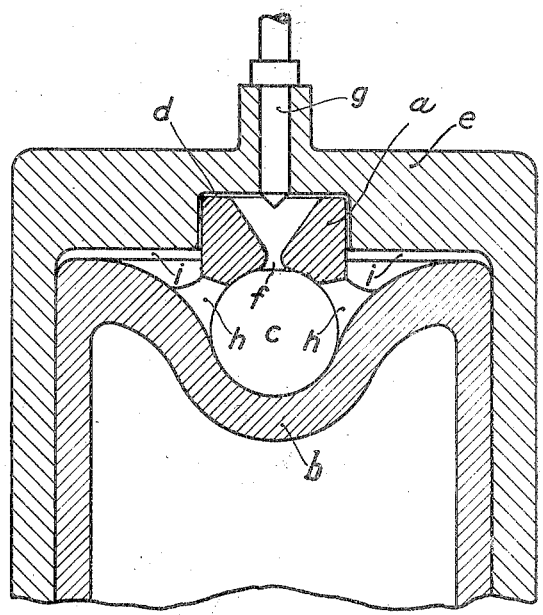

Patented Aug. 7, 1928.

1,679,831

UNITED STATES PATENT OFFICE.

FRANZ LANG, OF STUTTGART, GERMANY, ASSIGNOR TO ACRO AKTIENGESELLSCHAFT. OF KUSSNACHT-ON-THE-RIGI, SWITZERLAND.

COMBUSTION POWER ENGINE WITH SELF-IGNITION.

Application filed October 12, 1925, Serial No. 62,182, and in Germany October 29, 1924.

It is known in combustion power-engines with self-ignition to arrange the combustion chamber on the piston and to arrange on said piston a dislodging device for the compressed air, in order to effect a more thorough mixing of the air with the fuel.

As compared with these arrangements the injection-engine with self-ignition according to the present invention is distinguished by the feature, that the fuel fed through the injection nozzle, while being mixed with the compressed air, passes first into the dislodging device, arranged above the piston cover, and thence into the combustion chamber of the piston.

The fuel-air-mixture, while issuing from the dislodging device, receives an increase of speed by means of a nozzle, arranged between the dislodging device and the combustion chamber of the piston.

The admission of air and fuel to the dislodging device is further regulated by means of a funnel-shaped recess, which communicates with the nozzle leading to the combustion chamber of the piston.

Finally the piston-combustion-chamber is connected with the cylinder-combustion-space by means of a plurality of channels, which on account of their nozzle-like shapes form guideways, which permit an even flow of the compressed air and the ignited mixture free from jars or jolts.

According to this invention the flow of air and therewith the mixture of air and fuel is promoted by a dislodging device which enters into action between the piston and the cylinder-head at the latter portion of the compression-stroke, said dislodging-device serving to force the air displaced by it to flow through a restricted passage into the chamber in the piston-head.

In consequence thereof a complete carburation of the fuel, injected into the dislodging device in the form of a veil or mist is obtained, said complete carburation insuring self-ignition at that spot of the fuel- and air-mixture, which is most fit for this purpose, inasmuch as it is located where it is kept heated by the surrounding compressed gases. Furthermore by the scavenging of all the passages for the air and fuel at each working stroke, the guideways are held free from combustion-residues and the self-ignition is effected even with low compression-pressures.

In the accompanying drawing, in which one form of construction of the subject-matter of my invention is illustrated, the figure shows a vertical section through the upper part of the cylinder and piston.

The dislodging device or projection $a$, extending beyond the head of the piston, is provided with a funnel-shaped recess which communicates with or terminates in the nozzle $f$, leading to the piston-combustion chamber $c$.

In the upper dead center position of the piston the dislodging device or projection $a$ enters into the dislodging space or recess $d$ of the cylinder $e$ and rests axially below the nozzle $g$.

From the combustion chamber $c$ vents or outlets $h$ lead to the combustion space $i$ of the cylinder, said outlets being nozzle-shaped and forming on account of this shape jerk-free guideways for the compressed air and the ignited mixture, respectively.

The fuel-veil or -mist is rushed by the nozzle $g$ into the funnel-space of the dislodging device $a$, while being thoroughly mixed with the air in such a manner, that whirls of the mixture are formed, and is finally projected, with increasing speed, through the nozzle $f$ into the combustion chamber $c$.

The gases, adapted to be ignited in the combustion chamber $c$, are ignited, after having contacted with the air entering through the vents or outlets $h$ and being further mixed with said air, at the spot which is most fit for ignition; thence said gases pass, on the one hand through the dislodging device and on the other hand through the vents or outlets $h$, in work-performing condition into the cylinder space, while the piston is descending.

It will be observed that the combustion chamber $c$ is arranged in a depression or recess in the piston-head, whereby the compression of the gases in the cylinder is increased and the cylinder length for a given degree of compression may be diminished.

In operation, during the last part of the piston-stroke the projection $a$ enters the recess $d$ of the cylinder, intensely compressing the air therein and dislodging the same therefrom through the nozzle or orifice $f$ into the piston-chamber $c$. The fuel projected into the recess and through the nozzle mixes with the air in said recess, the mixture flowing with accelerated speed into chamber $c$, said air being more strongly compressed by said projection than the remainder of the air in the cylinder as the piston finishes its compression-stroke. The resulting mixture ignites and the pressure due to the ignition causes the combustion gases to escape through the vents or outlets $h$ into the cylinder-space $i$, igniting them in turn.

I claim:

1. In a combustion engine, a cylinder and a piston working therein, in combination with a combustion chamber arranged in the piston, a dislodging device between the cylinder and the piston and communicating with the combustion-chamber, and arranged to force the compressed air into said chamber, and a fuel injector arranged to inject fuel into the dislodging device.

2. In a combustion-engine, a cylinder provided with a recess at its head, and a piston working therein, in combination with a projection formed on the piston head and arranged to engage the said recess at end of the compression stroke, a combustion-chamber being also formed in the piston head, and a communicating orifice between the recess in the cylinder and the combustion chamber, and a fuel injector in the cylinder head so arranged as to inject fuel into said recess.

3. Combustion-engine, as set forth in claim 1, wherein the combustion-chamber in the piston is provided with one or more channels or vents forming a communication between the combustion space in the piston and the combustion-space in the cylinder.

4. Combustion engine as set forth in claim 1, wherein the combustion chamber in the piston is provided with one or more channels or vents of nozzle-like shape arranged to form a communication between the said combustion-chamber and the combustion-space of the cylinder.

5. Combustion engine as set forth in claim 1, wherein the combustion-chamber is formed in a recess or concavity in the piston-head.

6. Combustion engine as set forth in claim 1, wherein the dislodging device is formed with a communication-channel in line with the fuel-injector in the projection on the piston said channel being funnel-shaped at one end and terminating in a constricted nozzle-like outlet leading into the chamber in the piston.

In testimony whereof I have hereunto affixed my signature.

FRANZ LANG.